United States Patent

[11] 3,571,964

| [72] | Inventor | Stephen Bogathy |
| | | 9759 S. Maryland Ave., Chicago, Ill. 60628 |
| [21] | Appl. No. | 852,688 |
| [22] | Filed | Aug. 25, 1969 |
| [45] | Patented | Mar. 23, 1971 |

[54] FISHING POLE AND BAIT HOLDER
9 Claims, 6 Drawing Figs.

[52] U.S. Cl. .................................................. 43/21.2,
43/55, 248/39, 248/44
[51] Int. Cl. .................................................. A01k 97/10
[50] Field of Search ........................................... 43/21.2, 55,
56; 248/37.3, 38, 39, 44, 110; 211/60; 47/41,
41.11, 41.12

[56] References Cited
UNITED STATES PATENTS

| 2,367,588 | 1/1945 | Kruse .......................... | (43/55UX) |
| 2,555,073 | 5/1951 | Zdankoski ................... | 43/55 |
| 2,596,403 | 5/1952 | Hoffman ...................... | 43/21.2 |
| 2,716,834 | 9/1955 | DeBonville et al. .......... | 43/55 |
| 2,774,563 | 12/1956 | Pribis ........................... | 43/21.2X |
| 2,949,691 | 8/1960 | Johnson ....................... | 43/55 |

FOREIGN PATENTS

| 774,831 | 10/1934 | France ......................... | |
| 11,903 | 0/1915 | Great Britain ................ | 248/39 |

*Primary Examiner*—Samuel Koren
*Assistant Examiner*—Daniel J. Leach
*Attorney*—Pendleton, Neuman, Anderson & Williams ABSTRACT: A pail having a cluster of cups along one side of its rim and a cluster of sockets in the side of the pail opposite the cups, the cups and sockets being arranged to receive the handle and adjacent portions of several fishing poles and hold the poles in place for fishing while the pail contains bait or other fishing materials and provides a stool for the fisherman to sit upon.

PATENTED MAR 23 1971
3,571,964
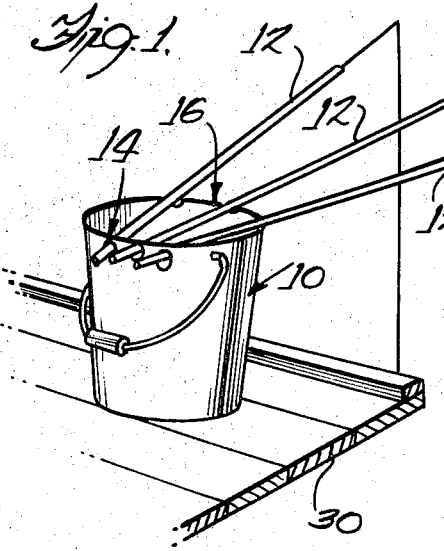
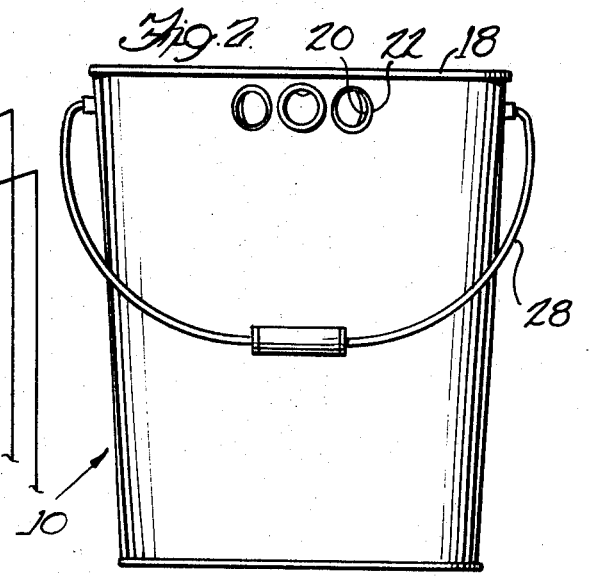
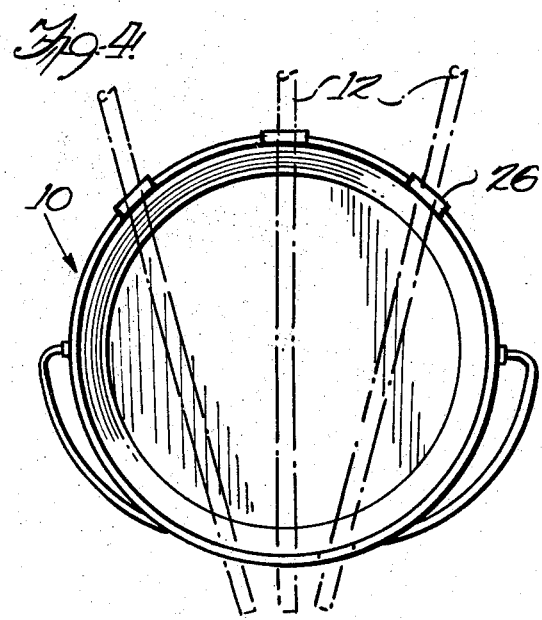
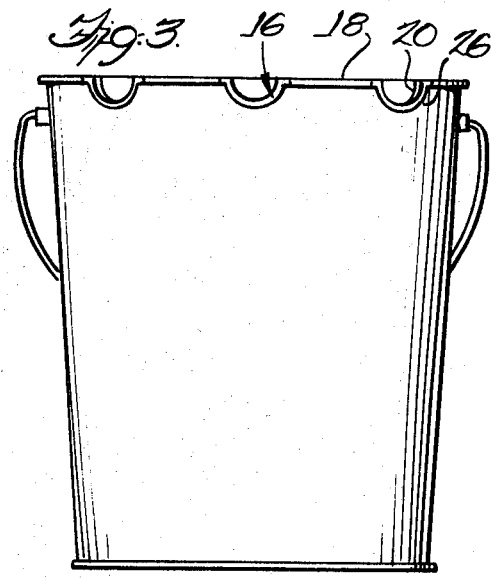
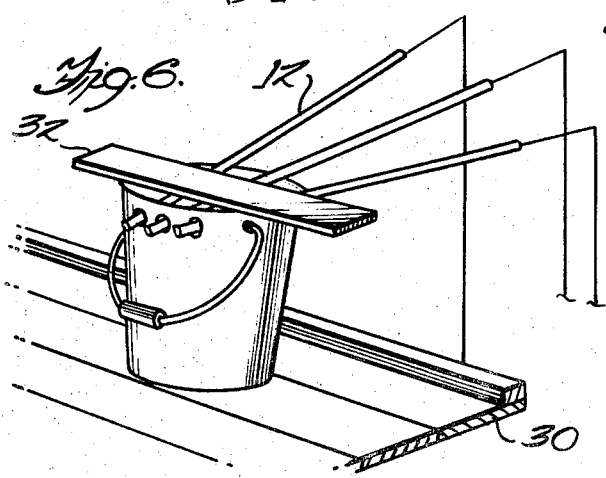
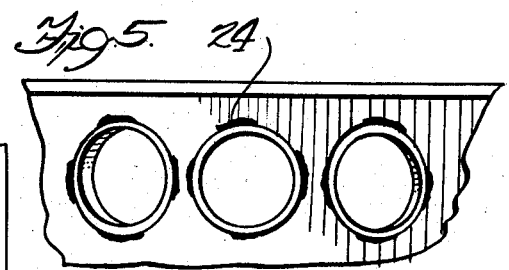
Inventor
Stephen Bogathy
Pendleton, Newman
by: Seibold & Williams
Atty's 3,571,964

FISHING POLE AND BAIT HOLDER

BACKGROUND OF THE INVENTION

Most fishing pole holders utilize a bracket of one form or another to grasp the pole. Some of these brackets incorporate various forms of clamps and some incorporate a sleeve member into which the handle portion of a fishing pole may be inserted. Such brackets are often supported either by permanently affixing them to the deck of a vessel or by engaging them onto a post attached to the deck. On shore, the brackets are often fastened by clips or threaded members to a stake driven into the ground or to a solid structure such as a railing. When a sleeve member is used, it sometimes holds the fishing pole around an intermediate portion of the pole between the handle and the tip, or around the handle alone, or at both places.

Some forms of brackets include a clasp or shallow container portion, into which the butt end of the pole is inserted, and a forked or U-shaped support usually spaced apart from such container for engaging an intermediate portion of the pole. The pole may be wedged or clamped into the bracket, or merely thrust into and rested upon the bracket members.

Still another form of bracket includes convoluted metal straps or wires, the rear portions of which are shaped in an inverted "U" and the forward portions of which are shaped as an upright "U," so that when the pole is engaged in the bracket, the forward portion of the structure becomes a fulcrum and the weight of the outer end of the pole bearing upon the two straps holds the pole firmly in position for fishing.

Still another form of bracket includes a short standard attached to a base and having at the upper end of the standard a flexible connection to a support for a series of sleeves. The bracket vacillates on the flexible connection to allow the outer end of the pole to bob up and down with movement of the bracket while the base is secured in a socket chopped into the surface of an ice-covered lake. Such a construction is shown in the U.S. Pat. No. 3,074,197, issued Jan. 22, 1963, to J. A. Schnars.

SUMMARY OF THE INVENTION

In the invention described herein, a pail is provided having a cluster of cup members along one side of the pail adjacent the rim and a cluster of socket members in the other side so that a number of fishing poles may be conveniently disposed across the mouth of the pail, and at the same time the lower portion of the pail contains a supply of live bait or other fishing equipment and forms a stool for the fisherman to sit upon.

It is one of the objects of this invention to provide a pail which incorporates a fishing pole holder into the walls of the pail.

Another object of the present invention is to provide a fishing pole holder which also includes storage space for live bait or refreshments or other equipment of the fisherman.

A further object of the invention is to provide a fishing pole holder and bait container which are integral with each other.

Still another object of this invention is to provide a compact fishing rod and bait holder which has both portability as well as a high stability in use.

Accordingly, a pail is provided having a cluster of cup members along the upper edge of the pail and a cluster of socket members adjacent the pail rim opposite the cup members. The socket members are positioned close together in a socket cluster and the cup members are spaced apart laterally from each other at a greater distance than the socket members in the socket cluster.

DESCRIPTION OF THE DRAWINGS

Other objects and advantages of the present invention will become apparent from an examination of the accompanying drawings, in which:

FIG. 1 is a perspective view of a preferred embodiment of the invention in use showing a pail having a plurality of cup members along the rim, a plurality of socket members in the side of the pail opposite the cup members, and including a plurality of fishing poles disposed in the cup and socket members;

FIG. 2 is an elevational view of the pail portion of the embodiment shown in FIG. 1 showing the side of the pail containing the socket members;

FIG. 3 is an elevational view of the pail portion of the embodiment shown in FIG. 1 showing the side of the pail opposite the cluster of socket members shown in FIG. 2;

FIG. 4 is a top plan view of the embodiment shown in FIG. 1;

FIG. 5 is an enlarged view of a portion of the pail shown in FIG. 2 showing in enlarged detail the socket members disposed in the pail wall;

FIG. 6 is a perspective view of a modified form of the embodiment shown in FIG. 1 including a seat disposed over the mouth of the pail.

DESCRIPTION OF THE PREFERRED EMBODIMENT

Referring more particularly to the drawings, there is shown in FIG. 1 a pail 10, sized preferably to hold approximately five gallons of water, upon which pail a plurality of fishing poles 12 rest with their butt portions engaged in a cluster of socket members 14 and intermediate pole portions engaged in a cluster of cup members 16. As shown more particularly in FIGS. 2 and 3, the socket members are disposed in a cluster in one wall of the pail and are positioned close to each other below the rim 18 of the pail. In the preferred embodiment, the sockets are formed as apertures through the pail wall 20 surrounded by flanges 22. The flanges are supported on the pail wall by means such as welds 24, as shown in FIG. 5. On the opposite side of the pail the cluster of cup members 16 are disposed adjacent the pail rim 18, each cup member in the cluster being spaced apart laterally from each other at a greater distance than the socket members in the socket cluster. Each cup member includes a crescent-shaped flange 26 which engages at each end the rim 18 and has a portion intermediate each end engaging the wall 20 of the pail below the rim. As shown, particularly in FIG. 1, the cluster 14 of socket members is positioned closer to the bottom of the pail than the cluster of cup members. The pail is also provided with a carrying member such as bail 28 which affords ready portability of the fishing pole holder and bait container structure.

When the fishing poles 12 are assembled with the holder and bait container structure, the butt end portions of the fishing poles are inserted in the socket members and extend, as shown in the preferred embodiment in FIG. 1, through the apertures formed by the socket members to project a short way through the wall of the pail; an intermediate portion of each of the fishing poles rests in the cup members in the opposite side of the pail. By situating the socket members closer to the bottom of the pail than the cup members and also by spacing the cup members apart laterally from each other at a greater distance than the socket members in the socket cluster, the poles, when engaged with the holder and bait container structure are are positioned in a fan-shaped manner, as shown particularly in FIG. 4, and are also disposed so that their outer extremities are slightly higher than their butt end portions, as shown particularly in FIG. 1. The poles thus rest securely in place since the intermediate portions of the pole are frictionally engaged in the cup members. This arrangement permits easy and rapid removal of the poles from the pole and bait holder when a fish bites.

In use, the pole and bait holder is extremely versatile and may be readily transported from place to place, or stored, because in such circumstances it does not ordinarily contain a quantity of water. It may be used under a variety of circumstances; as it will be noted, it is unnecessary while fishing to affix any post or bracket-supporting rod in the ground or to a permanent installation. Enough water may be obtained at every fishing location to be certain that the pail is properly weighted by an amount of water placed therein to secure the pail in an upright position for holding the poles. The invention may be used as readily on a wooden pier, such as the pier 30 shown in FIG. 1, as on a bank of earth. This is particularly advantageous to the casual fisherman who does his fishing from a variety of piers or bridges in heavily-populated areas. Also, the same structure which provides the cup and socket members for holding the fishing poles also provides a container for water to weight the pail securely and also to hold the fisherman's bait or refreshments. As shown in FIG. 6, a seat member 32 may be positioned across the mouth of the pail over the fishing poles so that as the fisherman waits for a bite, the pole and bait holder structure will provide him with a suitable accommodation for relaxation.

Reasonably variations and modifications are possible within the scope of the foregoing disclosure and the appended claims.

I claim:

1. A pail having a cluster of cup members along the upper edge of the pail and a cluster of socket members adjacent the pail rim opposite the cup members, said socket members being positioned closed together in the socket cluster, and said cup members being spaced apart laterally from each other at a greater distance than said socket members in the socket cluster.

2. The pail of claim 1 in which the cup members are partially disposed in the rim of the pail.

3. The pail of claim 1 in which each of the cup members is formed by a notch in the pail rim.

4. The pail of claim 1 in which each of the cup members includes a crescent-shaped flange engaging at each end the pail rim and having at least a portion intermediate each end engaging the wall of the pail below the rim.

5. The pail of claim 1 in which the cluster of socket members is disposed closer to the bottom of the pail than said cluster of cup members.

6. The pail of claim 1 in which each of said socket members includes a flange disposed about an aperture in the wall of the pail.

7. The pail of claim 1 having a carrying member on the wall of the pail intermediate the cluster of cup members and the cluster of socket members.

8. The pail of claim 1 having a seat member engaging the rim of the pail intermediate the cluster of cup members and the cluster of socket members.

9. The pail of claim 1 having a plurality of fishing poles engaged in the cup members and socket members, each pole resting along an intermediate portion of its length in a cup member and having a butt end portion extending through a separate socket member in the socket cluster.